United States Patent
Qiao (10) Patent No.: US 7,685,572 B1
(45) Date of Patent: Mar. 23, 2010

(54) METHOD OF STATIC ANALYSIS FOR RACE CONDITION DETECTION

(75) Inventor: Donghai Qiao, Reading, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1251 days.

(21) Appl. No.: 11/208,265

(22) Filed: Aug. 19, 2005

(51) Int. Cl.
*G06F 9/44* (2006.01)
*G06F 11/00* (2006.01)
*G06F 7/00* (2006.01)

(52) U.S. Cl. ............... 717/126; 717/131; 717/155; 714/38; 707/8

(58) Field of Classification Search ............... None
See application file for complete search history.

(56) References Cited

U.S. PATENT DOCUMENTS 6,343,371 B1 * 1/2002 Flanagan et al. ............ 717/124
7,516,446 B2 * 4/2009 Choi et al. ............ 717/128
2007/0050603 A1 * 3/2007 Vorbach et al. ............ 712/221

OTHER PUBLICATIONS

Eytani, Yaniv, et al.; "Heuristics for Finding Concurrent Bugs"; International Parallel and Distributed Processing Symposium (IPDPS'03), IEEE Computer Society; 2003; 9 pages.
Prvulovic, Milos, et al.; "ReEnact: Using Thread-Level Speculation Mechanisms to Debug Races in Multithreaded Codes"; Proceedings of the 30th Annual International Symposium on Computer Architecture (ISCA-30), Jun. 2003; 12 pages.

* cited by examiner

*Primary Examiner*—Michael J Yigdall
(74) *Attorney, Agent, or Firm*—Osha • Liang LLP (57) ABSTRACT

A method for detecting a race condition using static analysis that includes determining a first permit set and a second permit set, and performing a static analysis, wherein the static analysis comprises using the first permit set and the second permit set to detect a race condition, wherein the static analysis is performed before accessing critical data and includes determining whether the intersection of the first permit set and the second permit set is empty, and if the intersection of the first permit set and the second permit set is empty, then outputting a value indicating the detection of a race condition.

16 Claims, 7 Drawing Sheets

METHOD OF STATIC ANALYSIS FOR RACE CONDITION DETECTION

BACKGROUND

A process is a series of actions, changes, or procedures that bring about a result. A process may be a thread in execution on a computer, an action being performed, or any other actions, series, changes or procedures which being about a result.

As a mechanism to provide greater throughput in execution, processes are often executed concurrently. Thus, during execution of one process another process may also execute. While concurrent execution leads to greater performance, if more than one process accesses a data element, then the data element may become inconsistent. Critical data is data which may become inconsistent. More formally, critical data is data that is accessible by multiple processes where at least one access to the data by a process changes the value of the data. A race condition on the critical data occurs when at least one process accesses the critical data without synchronization with the other processes and at least one process changes the value of the critical data.

A common example of a race condition occurring is when two people access the same bank account using automatic teller machines (ATM) located in different parts of town. For this example, suppose the first person wants to deposit $20 to the bank account (process A) and the second person wants to withdraw $5 from the bank account (process B). Also suppose the initial amount in the bank account is $40. In the first step, process A reads the bank account value (i.e., $40). In the second step, process A accepts the deposit and adds $20 to the amount process A read (i.e., $40). In this same second step, process B reads the bank account value (i.e., $40). In the third step, process A updates the bank account value to $60 and process B subtract $5 from the amount process B read (i.e., $40). In the fourth step, process B updates the bank account value to $35. The result of this execution is that rather than having a correct balance of $55, the final account balance is $35.

One method of preventing a race condition is through synchronization. In the above example, suppose that before process A starts executing, process A first informs process B that it is changing the critical data. B receives the information and waits until A informs B that A has finished accessing the critical data. A then executes while B waits. After receiving the message from A that A has completed executing, B begins. The result of this execution is that the final correct balance of $55 is achieved.

There are several mechanisms for synchronization. These mechanisms include the use of messages, locks, semaphores, monitors, etc. Basically synchronization requires that a process must first acquire the rights to access the critical data before accessing the critical data. This may be done through preventing access to the other processes or simply informing the other processes that it is accessing the critical data. This is not a requirement if all of the processes merely read the critical data.

Mechanisms for detecting a race condition are based on determining whether a process has acquired the rights to access the critical data before accessing the data. Past mechanisms for detecting a race condition are based upon a dynamic analysis of the system. Thus, these past mechanisms only detect a race condition during the execution of the processes.

SUMMARY

In general, in one aspect, the invention relates to a method for detecting a race condition using static analysis that includes determining a first permit set and a second permit set, and performing a static analysis, wherein the static analysis comprises using the first permit set and the second permit set to detect a race condition, wherein the static analysis is performed before accessing critical data and includes determining whether the intersection of the first permit set and the second permit set is empty, and if the intersection of the first permit set and the second permit set is empty, then outputting a value indicating the detection of a race condition.

In general, in one aspect, the invention relates to a method for detecting a race condition using static analysis that includes determining a first permit set and a second permit set, performing a static analysis, wherein the static analysis comprises using the first permit set and the second permit set to detect a race condition, and creating a plurality of data sets, wherein the first permit set and the second permit set are associated with at least one selected from the plurality of data sets, wherein the static analysis is performed prior to accessing critical data and includes determining whether the intersection of the data set associated with the first permit set and the data set associated with the second permit set is empty, and if the intersection of the data set associated with the first permit set and the data set associated with the second permit set is not empty, then determining whether the intersection of the first permit set and the second permit set is empty, and if the intersection of the first permit set and the second permit set is empty, then outputting a value indicating the detection of a race condition.

In general, in one aspect, the invention relates to a computer readable medium comprising software instructions for detecting a race condition using static analysis comprising software instructions to determining a first permit set and a second permit set, and performing a static analysis, wherein the static analysis comprises using the first permit set and the second permit set to detect a race condition, wherein the static analysis is performed before accessing critical data and includes determining whether the intersection of the first permit set and the second permit set is empty, and if the intersection of the first permit set and the second permit set is empty, then outputting a value indicating the detection of a race condition.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of this invention relate to a method for detecting the existence of a race condition. Specifically, embodiments of the invention find the paths to critical data and determine whether the paths may cause a race condition. More specifically, embodiments of the invention perform a static analysis on the paths to determine whether the path has access rights to the critical data before accessing the critical data.

A race condition occurs when a critical data element is accessible by multiple processes and at least one process changes the critical data element (e.g., through a write, delete, modify command, etc.) and at least one process does not inform the other processes that it is accessing the critical data element, or has access rights to the critical data element. For example, a race condition occurs when one process has the access rights to a critical data element before writing to the critical data element, while another process simply reads from the critical data element without first acquiring access rights. Those skilled in the art will be able to appreciate that several mechanisms exist for a process to inform the other processes that it is accessing the critical data and thereby prevent a race condition. These mechanisms include sending messages to all processes or having a scheme associated with the critical data such as semaphores or monitors.

Figure 1:
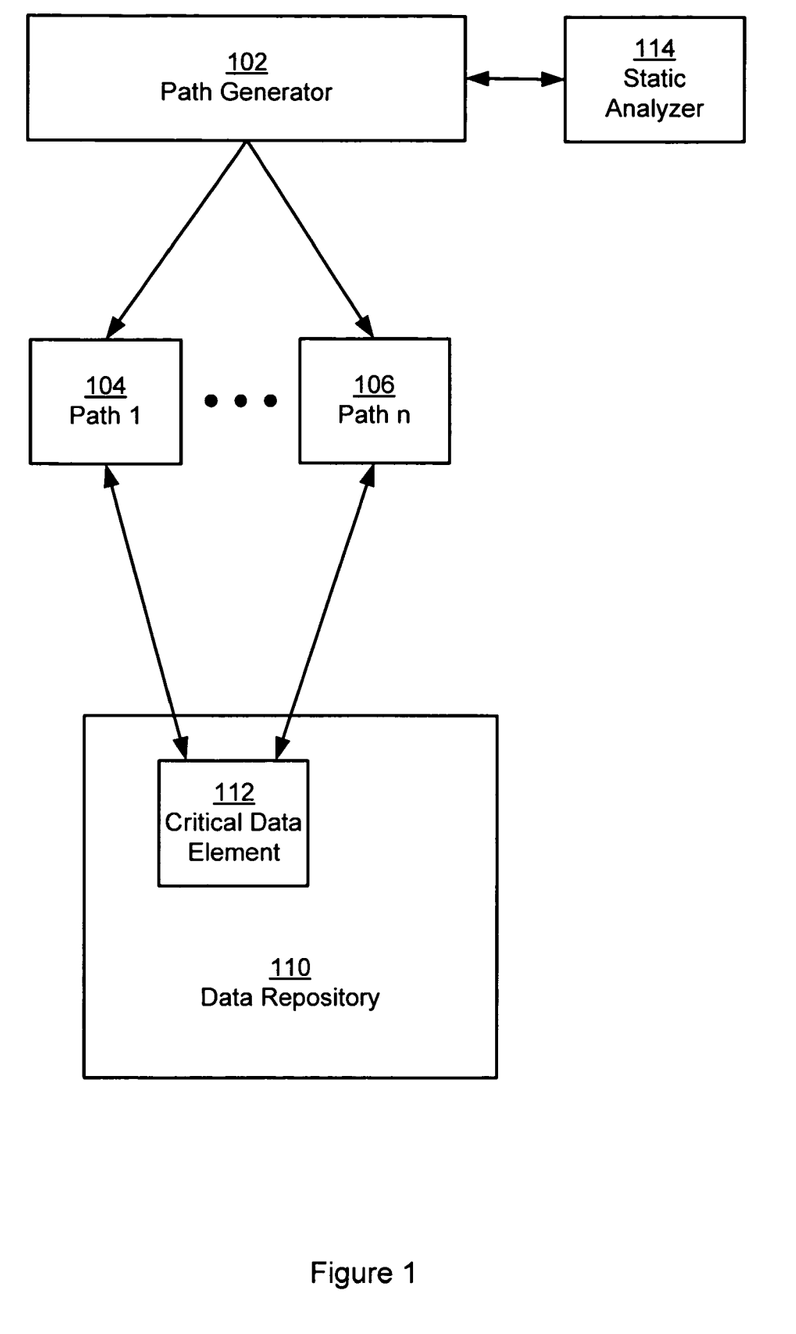
FIG. 1 shows a system for detecting race conditions in accordance with an embodiment of the present invention.

FIG. 1 shows a system for detecting a race condition in accordance with one embodiment of the invention. The system includes a path generator (102), one or more paths (104, 106, 108), a data repository (110) with critical data element (112), and a static analyzer (114). Each of these aforementioned components will be described in detail below.

The path generator (102) is a component with functionality to create several paths (104, 106). The path generator (102) may be a computer program which may create multiple threads, a computer which may execute multiple programs, or any other device which may generate paths (104, 106) which could be executed concurrently. Further, in one embodiment of the invention, the path generator may correspond to source code written in virtually any programming language, such as JAVA™, C, C++, Fortran, Basic, etc.

In accordance with one embodiment of the invention, the paths (104, 106) are access routes to data. Specifically, executing processes may follow the paths in order to access the data. A process is a series of actions, changes, or procedures which bring about a result. For example, a process may be a thread in execution, a group of threads in cooperative execution, etc. Accordingly, the paths (104, 106) may both be through the same computer program, or through individual computer programs. Therefore, the paths (104, 106) that the processes follow may be tightly related, with only a few differences in the route, or only related by access to the same data.

Data is stored in the data repository (110) as data elements. The data repository (110) may be a flat-file, hierarchical, or relational database, as well as virtually any other storage unit for data. Further, the data repository may be implemented on one or more storage devices. In accordance with one embodiment of the invention, a storage device may store data in memory, such as Random Access Memory (RAM), etc. While the data repository (110) may store non-critical data elements (not shown), the data repository may also store critical data elements (112).

A critical data element (112) is a data element that is accessible by multiple paths where at least one access to the data by a path changes the value of the data. A single critical data element (112) may be protected by a single access right request (e.g., single lock, single monitor, etc.). Additionally, the size of the critical data element (112) may vary. For example, a critical data element (112) may be an integer, an array, a file, a part of an array, a part of a file, etc.

Further, a critical data element (112) may be related to other critical data elements (112) through data dependencies. For example, if in order to modify one critical data element, a second critical data element must be accessed, then the first critical data element is dependent on the second critical data element. A data set is a group of critical data elements in which every critical data element (112) is in a dependency relationship with another critical data element (112) in the data set. Further, no critical data element (112) in the data set may be dependent on a critical data element outside of the data set.

A data set is a maximal data set if a critical data element (112) does not exist outside of the data set which is dependent on a critical data element (112) inside the data set. A data set is a minimal data set if removing any critical data element (112) from the data set causes a critical data element (112) in the data set to be dependent upon an data element (112) outside of the data set.

Continuing with FIG. 1, associated with the path generator (102) is a static analyzer (114). In accordance with one embodiment of the invention, the static analyzer (114) is a process or mechanism which includes functionality to analyze the paths (104, 106) and the path generator (102) in order to determine which data elements are critical data elements (112) and whether a race condition exists on the critical data elements (112). In accordance with one embodiment of the invention, the static analyzer (112) also includes functionality to determine the paths (104, 106) from the path generator (102). Specifically, in one embodiment of the invention, the static analyzer may include functionality to analyze the source code (e.g., the data structures in the source code) of the paths (104, 106), and the path generator (102) and determine which data elements are critical data elements (112) before the paths access the data repository (110). In accordance with one embodiment of the invention, the static analyzer (112) includes functionality to create permit sets.

A permit set is a set representing the access rights that a path (104, 106) has when it accesses a critical data element (112). Accordingly, a separate permit set may be associated with each combination of critical data element (112) and path that accesses that critical data element (112). For example, the permit set associated with path 1 (104) and critical data element (112) is the set representing the critical data elements that path 1 (104) has access rights to when path 1 (104)

accesses critical data element (112). A path (104, 106) has access rights to a critical data element (112) when the path (104, 106) has informed other paths (104, 106) that the path (104, 106) will access the critical data element (112) or when the path has prevented access to the critical data element (112). For example, a path (104, 106) may have access rights to a critical data element (112) when the path (104, 106) has locked the critical data element (112) without unlocking the critical data element (112) or when the path has entered the monitor associated with the critical data element (112) and has not yet exited the monitor.

Figure 2:
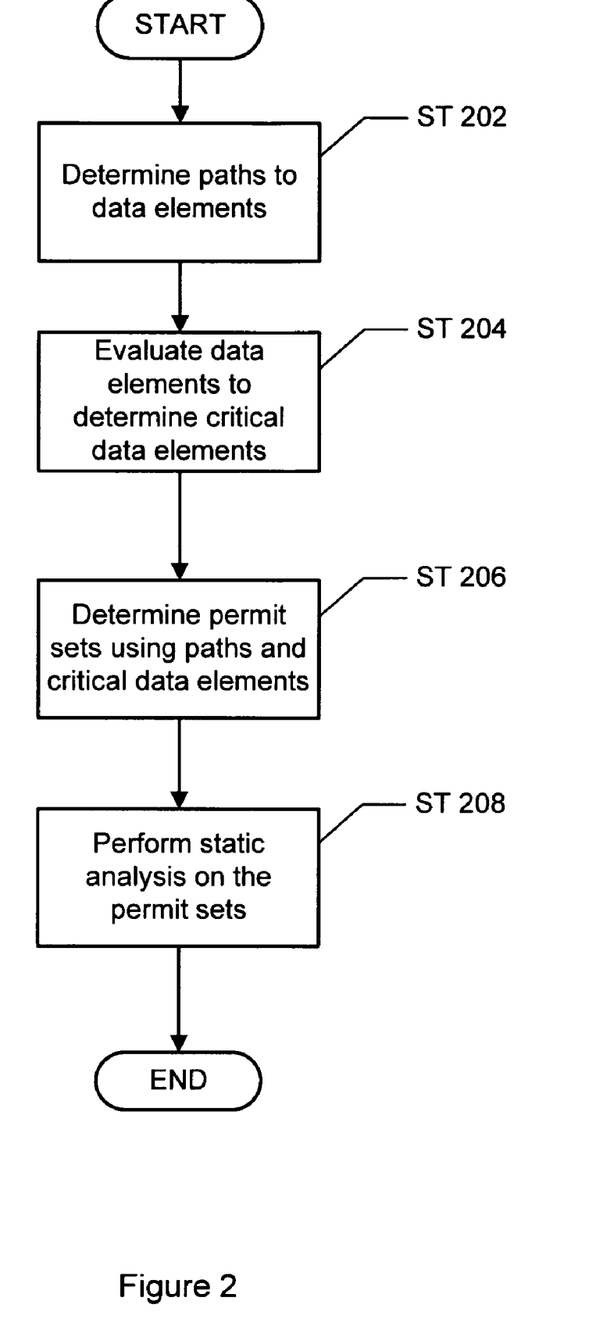
FIG. 2 shows a method for finding critical data and a detecting race condition in accordance with an embodiment of the present invention.

FIG. 2 shows a method for finding critical data elements and a detecting race condition in accordance with an embodiment of the present invention. Initially, paths to the data elements are determined (ST 202). In accordance with one embodiment of the invention, a path exists to a data element if during execution there is a process which may follow the path and access the data element. Those skilled in the art will appreciate that several methods exist for determining the paths to the data elements. These methods include logical analysis, mathematical analysis, enumeration of the paths that access data, etc.

Next, the data elements accessed by the paths are evaluated to determine the critical data elements (ST 204). In accordance with one embodiment of the invention, the critical data elements are determined by finding the data elements that are accessed by more than one path. Those skilled in the art will appreciate that when executed, multiple threads may execute the same path. Accordingly, a data element is also a critical data element if it is accessed multiple times by the same path.

While the data elements are evaluated, dependencies may also be determined from the critical data (not shown). This may be performed with prior knowledge of data dependencies or by performing an analysis of how the data is affected when the data paths are executed. By finding the data dependencies, data sets, maximum data sets, and minimum data sets may be created to represent the data dependencies.

Continuing with FIG. 2, after the critical data elements are determined (ST 204), the permit sets are determined using the paths and the critical data elements (ST206). In accordance with one embodiment of the invention, a permit set is created for each path and each critical data element that the path accesses. The permit sets may be determined by finding which critical data elements to which a path has the access rights when the path accesses the critical data element.

In accordance with one embodiment of the invention, knowledge of data dependencies are used. For example, a permit set is created for each path and data set when the path accesses a critical data element in the data set. Thus, there may be multiple permit sets associated with the same path and data set. The data sets may be minimum data sets, maximum data sets, or neither minimum nor maximum data sets.

In accordance with one embodiment of the invention, only partial information about data dependencies is used. In this case, then the critical data elements are assumed to be independent unless otherwise specified. Thus, the independent data elements may be regarded as a data set with only one element in the set.

After the permit sets are determined (ST 206), static analysis is performed on the permit sets (ST 208) to determine the existence of a race condition. Static analysis will be described in more detail in the continued discussion of FIG. 2 and in FIG. 3 below.

In one embodiment of the invention, results from the static analysis may be used to resolve the race condition. Those skilled in the art will be able to appreciate that there are several mechanisms to resolve a race condition. Two of these mechanisms are to modify the path so that the path requests access rights to access a critical data element before accessing the critical data element or to prevent the path from executing.

Figure 3:
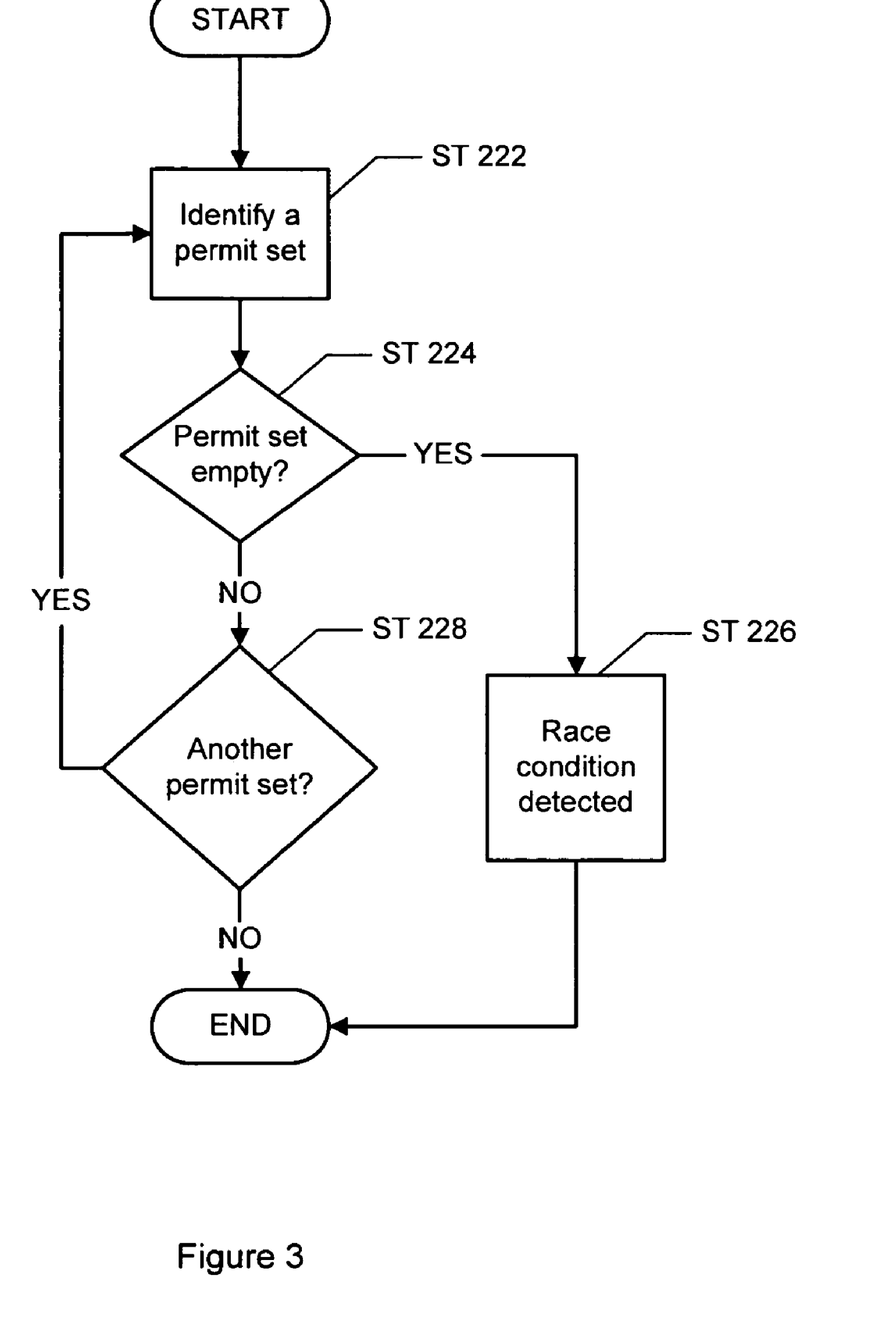
FIG. 3 shows a method for detecting race condition by checking permit sets in accordance with an embodiment of the present invention.

FIG. 3 shows a method for detecting race condition by checking permit sets in accordance with an embodiment of the present invention. Initially, a permit set is identified (ST 222). Next, a determination is made as to whether the permit set is empty (ST 224). If the permit set is empty, then a path has not acquired the access rights to a critical data element before accessing the critical data element, therefore a race condition is detected (ST 226). This may result in the outputting of an error message stating that the detection of a race condition. After detecting a race condition, the static analysis may either end (as shown in FIG. 3) or continue checking other permit sets.

Continuing with FIG. 3, if the permit set determined not to be empty (ST 224), then a determination is made as to whether there is a another permit set (ST 228). If another permit set exists which has not yet been checked, then the method repeats starting with step 224 for the next permit set. Otherwise, no race condition is detected, and the analysis ends.

Figure 4:
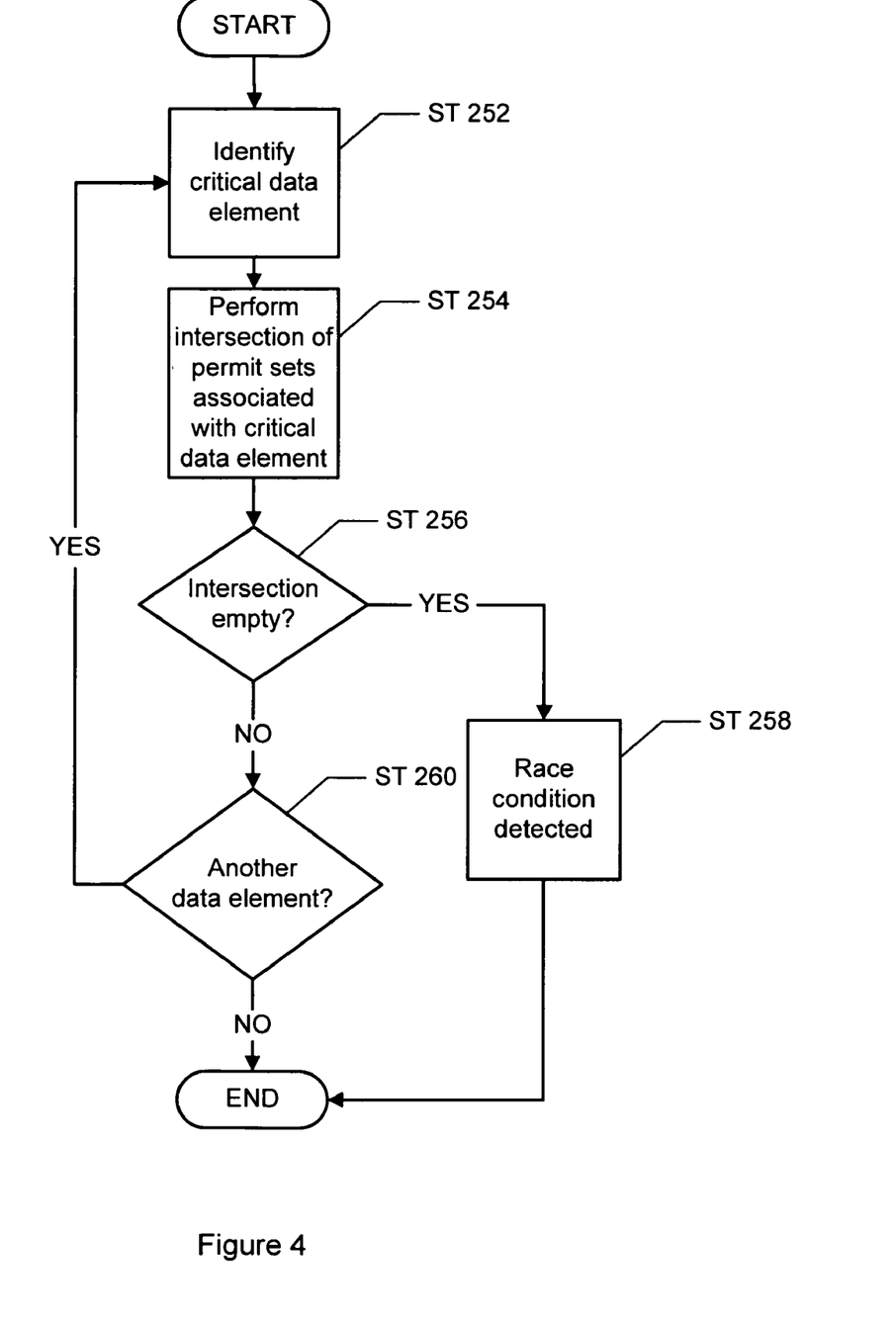
FIG. 4 shows a method for detecting race condition by comparing permit sets in accordance with an embodiment of the present invention.

FIG. 4 shows a method for detecting race condition by comparing permit sets in accordance with an embodiment of the present invention. FIG. 4 shows an embodiment of the invention in which data dependencies are not known or not used. Initially, a critical data element is identified (ST 252). Next, the intersection of the permit sets which are associated with the identified critical data element is performed (ST 254). Those skilled in the art will appreciate that the set produced by the intersection of the permit sets is the set of common elements within all permit sets associated with the identified critical data element.

After taking the intersection of the permit sets associated with the identified critical data element, a determination is made as to whether the intersection is empty (ST 256). In accordance with one embodiment of the invention, if the intersection is empty, then more than one path may access the critical data element at the same time with different access rights or the same path may access the critical data element more than one time with different access rights. Therefore, a race condition is detected (ST 258). This may result in the outputting of an error message stating that the detection of a race condition. After detecting a race condition, the static analysis may either end (as shown in FIG. 4) or continue checking other permit sets. Further, those skilled in the art will appreciate that in one embodiment of the invention, the intersection of the permit sets is performed for two permit sets at a time. Accordingly, steps 254-258 may be repeated for every two permit sets associated with the same critical data element.

Continuing with FIG. 4, if the intersection is determined not to be empty (ST 256), then a determination is made as to whether another critical data element exists (ST 260). If another critical data element exists which has not yet been checked, then the method repeats with step 252 for the next critical data element. Otherwise, no race condition is detected and the method ends.

Alternatively, if data dependencies are known, then for combinations of data sets having at least one critical data element and which are associated with a permit set, the intersection is performed on the combination. If the resulting intersection of the data sets associated with the combination is not empty, then an intersection is taken of the permit sets associated with the combination. Next, a determination is made as to whether the intersection of the permit sets is empty. If the intersection is empty, then a race condition is detected. Otherwise, the process may be repeated for all the data sets.

Those skilled in the art will appreciate that multiple permit sets may be associated with the same data set. For example, multiple paths may access the same data set. Accordingly, the intersection may be performed for all permit sets associated with the same data set. Furthermore, those skilled in the art will appreciate that the data sets which are required for the static analysis may be determined using the knowledge about race dependencies.

For example, knowledge about minimum data sets may be used. Specifically, in accordance with one embodiment of the invention, a minimum data set is identified in Step 252 of FIG. 4 rather than a single critical data element. Next, the intersection is performed on the permit sets associated with the minimum data set. If the intersection is empty, then a race condition is detected. Otherwise, the process repeats for the next minimum data set until all minimum data sets have been identified and permit sets checked.

Alternatively, in the case in which permit sets are associated with critical data elements, data sets, and/or minimal data sets, the method described above is performed for all critical data elements, data sets and minimal data sets, as described above.

In an embodiment of the invention, the invention may be implemented using a tree structure rather than set theory. The tree structure allows for a graphical representation of the data dependencies. The tree structure may be created using the following rules: for each critical data element, d, a data set is created containing all of the critical data elements that d is dependent upon. In accordance with one embodiment of the invention, a data set is a node in the tree. The data set and any subset(s) of the data set are child nodes of the data set. The root of the tree is the data set that is not a subset of another data set. If two roots have the same children nodes, then the union may be performed on their sets and the trees may be combined.

Figure 5:
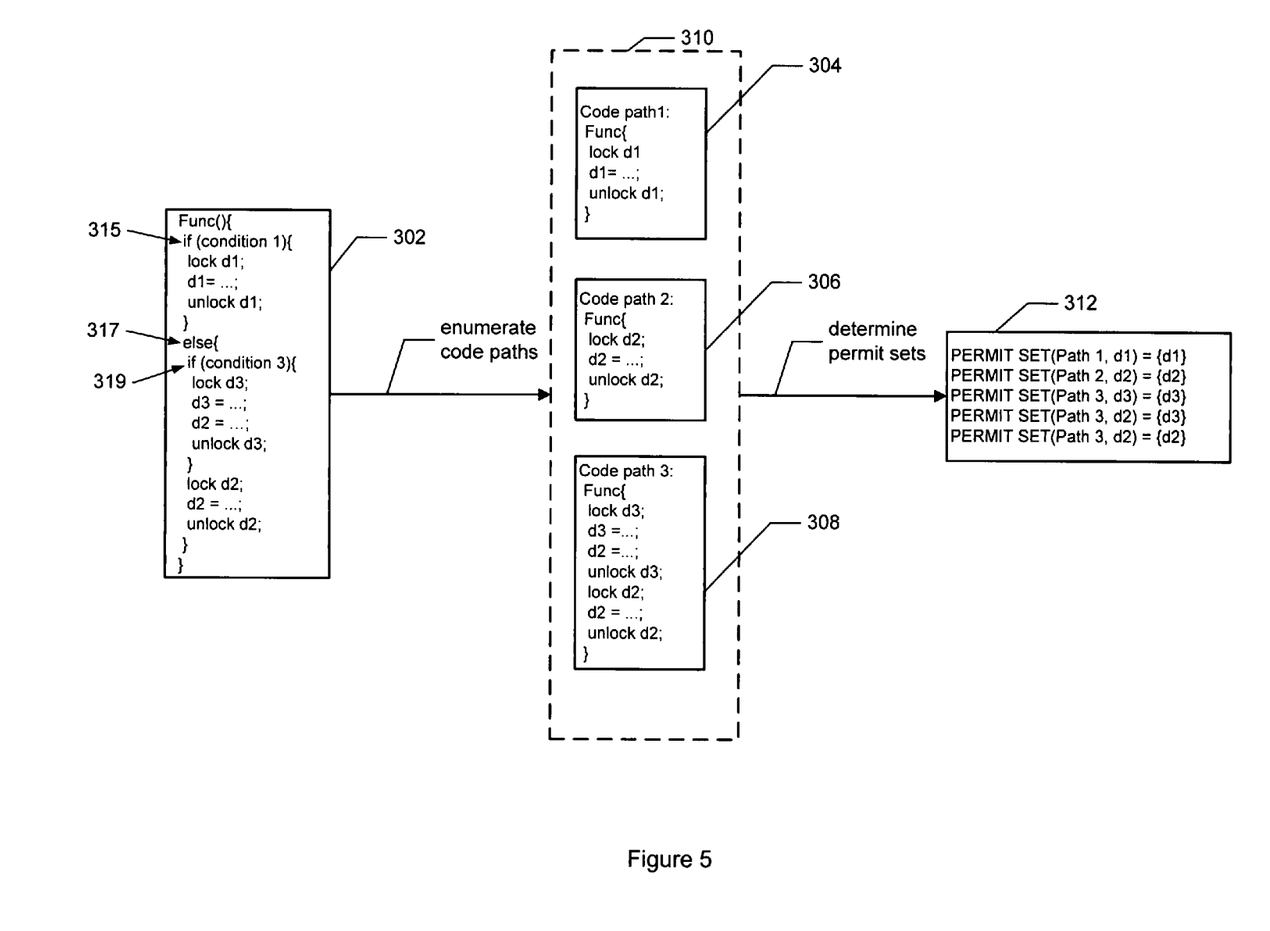
FIG. 5 shows an example flow diagram produced by a race condition detection process in accordance with an embodiment of the present invention.

FIG. 5 shows an example flow diagram produced by a race condition detection process in accordance with an embodiment of the present invention. For the purposes of this example, a static analysis is performed on a function (302) within a computer program in which several threads using this function (302) may be created at the same time. This example also assumes that all data elements are accessible by at least one path and therefore are critical data.

First, the code paths (310) are determined by enumeration. For example, code path 1 (304) is determined by assuming that the if (condition 1) (315) is evaluated to true, therefore the code within the if (condition 1) may be executed by code path 1. Code path 2 (306) is determined by assuming that if (condition 1) (315) evaluates to false, so the else statement (317) may be executed. Further, code path 2 (306) assumes that the if (condition 3) (319) evaluates to false and therefore is not executed in code path 2 (306). Code path 3 (308) is determined by assuming that if (condition 1) (315) evaluates to false, so the else statement (317) may be executed. Further, code path 3 (308) assumes that the if (condition 3) (319) also evaluates to true and therefore may be executed in code path 3 (308). As the above mentioned paths (310) are the only possible paths, the enumeration completes.

After the paths are enumerated (310), the permit sets are identified for each combination of path and critical data element that is accessed by a path. In this example, the permit set associated with a path and critical data element is the set of locks that a path has locked and not unlocked when accessing the critical data element. Thus, the permit set (Path 1, d1) is {d1} because when Path 1 (304) accesses critical data element d1, Path 1 (304) has the lock for critical data element d1. Likewise, when Path 2 (306) accesses critical data element d2, Path 2 (306) has the lock for critical data element d2. Accordingly, Permit Set (Path 2, d2)={d2}. Further, when Path 3 (308) accesses critical data element d3, Path 3 (308) has the lock for critical data element d3. Accordingly, Permit Set (Path 3, d3)={d3}.

However, Path 3 (308) accesses critical data element d2, twice. In accordance with one embodiment of the invention, two permit sets (312) are created for each access. Accordingly, the permit set for the first access is Permit Set (Path 3, d2)={d3} and the second access is Permit Set (Path 3, d2)={d2}.

After determining the permit sets (312), a static analysis may be performed. In accordance with one embodiment of the invention, the static analysis determines whether any of the permit sets (312) are empty sets. Because none of the permit sets (312) are empty, no race condition is detected.

In accordance with one embodiment of the invention, the static analysis checks the intersection of the permit sets (312). First, the intersection may be taken of all of the permit sets associated with critical data element d1. Because only one permit set (i.e., Permit Set (Path 1, d1)) exists that is not empty, no race condition is detected.

Next, an intersection of all of the permit sets (312) associated with d2 may be performed. Specifically, a intersection is taken of Permit Set (Path 2, d2), Permit Set (Path 3, d2), and Permit Set (Path 3, d2). As {d2} intersect {d3} intersect {d2} is empty, a race condition is detected. Accordingly, correction procedures may be performed, such as preventing the execution of this function or adding in a lock request. The static analysis may either end, or continue by checking the permit sets (312) associated with critical data element d3. As the intersection, of the permit sets (312) associated with data element d3 is not empty, a race condition is not detected for data element d3.

Figure 6:
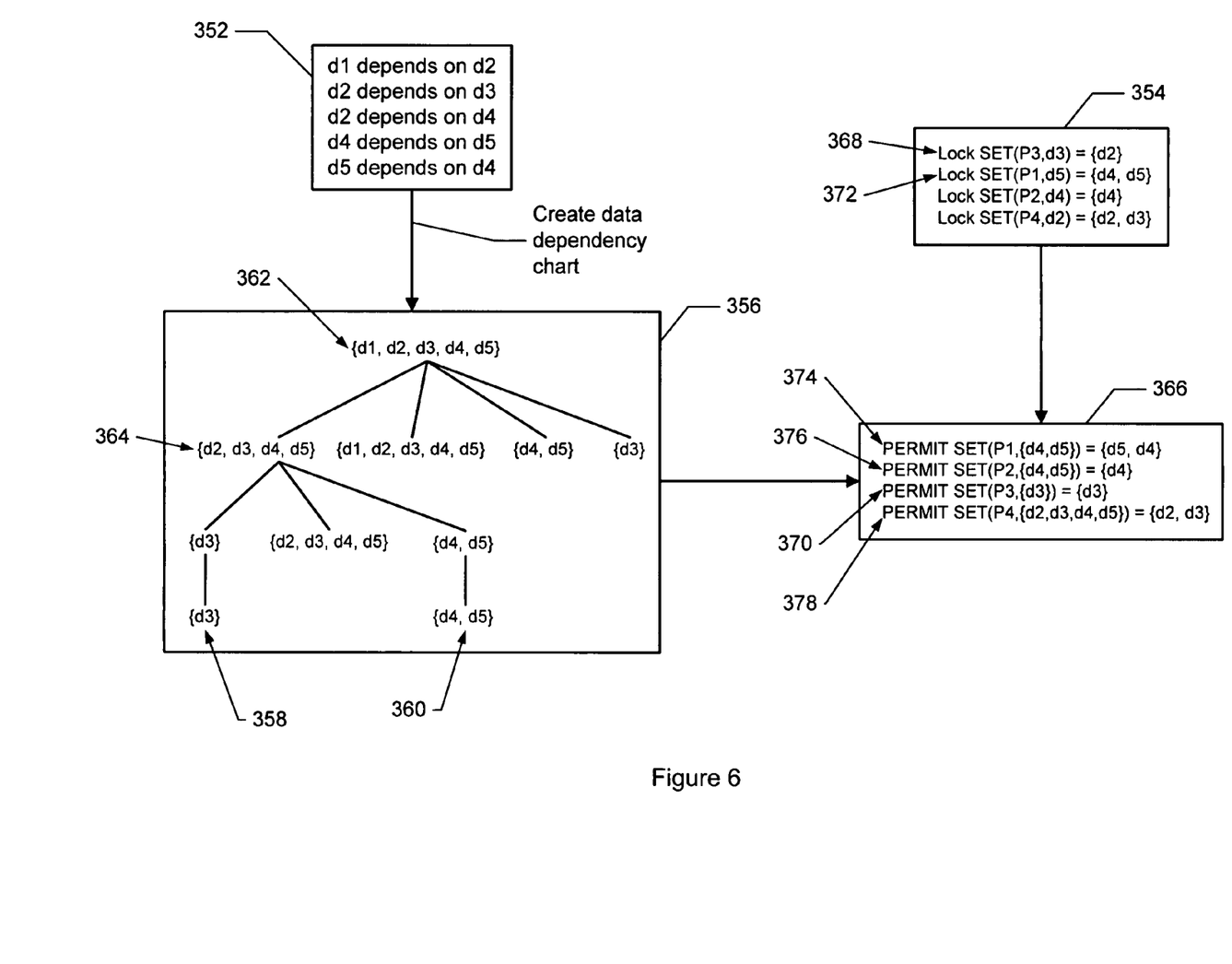
FIG. 6 shows an example flow diagram produced by a race condition detection process using data dependency information in accordance with an embodiment of the present invention.

FIG. 6 shows an example flow diagram produced by a race condition detection process using data dependency information in accordance with an embodiment of the present invention. In this example, both the data dependency information (352) and the lock set information (354) are known. A lock set (354) is a representation of the set of data elements that a path locks and does not unlock when it accesses a data element. The lock set (354) corresponds to a permit set when no data dependency information is used.

Initially, in accordance with one embodiment of the invention, the data dependency information may be used to create a tree (356) representing the dependencies. For example, as d3 is not dependent on any data, {d3} (358) is leaf. Further, as d4 and d5 are interdependent, {d4, d5} (360) is also a leaf. Both {d3} (358) and {d4, d5} (360) are minimum data sets. A maximum data set is {d1, d2, d3, d4, d5} (362) as d1 is dependent directly or indirectly on d1, d2, d3, d4, and d5. In accordance with one embodiment of the invention, while {d2, d3, d4, d5} (364) is neither a minimum data set, nor a maximum data set. However, {d2, d3, d4, d5} (364) is a data set because d2 is dependent, directly or indirectly on d2, d3, d4, and d5.

After the tree (356) is created, the lock sets (354) and the tree (356) may be used to create the permit sets. For example, using the Lock Set (Path 3, d3)={d2} (368) and because d3 is dependent on itself, a permit set (Path 3, {d3})={d2} (370) is created. Likewise, using the Lock Set (Path 1, d5)={d4, d5} (372) and because d5 is dependent on itself and d4, a permit set (Path 1, {d4, d5})={d4, d5} (374) is created. This process may be repeated for all of the Lock Sets.

After determining the permit sets (366), a static analysis may be performed. In accordance with one embodiment of the invention, the static analysis determines whether any of the permit sets (366) are empty. As none of the permit sets (366) are empty, no race condition is detected.

In accordance with one embodiment of the invention, the static analysis checks the intersection of the permit sets (366). Specifically, the static analysis finds a group of data sets associated with permit sets whose intersection is not empty. Then, the static analysis checks to see if the intersection of the permit sets are not empty.

For example, the intersection of data set {d3} and {d2, d3, d4, d5} is {d3}. Thus, the static analysis checks whether the intersection of the permit set (Path 3, {d3}) (370) and permit set (Path 4, {d2, d3, d4, d5}) (378) is empty. As {d3} intersect {d2, d3} is not empty, no race condition is detected.

Next, the intersection of data set {d4, d5}, {d4, d5} and {d2, d3, d4, d5} is {d4, d5}. So the static analysis checks whether the intersection of the permit set (Path 1, {d4, d5}) (374), permit set (Path 2, {d4, d5}) (376) and permit set (Path 4, {d2, d3, d4, d5}) (378) is empty. Because the intersection of {d5, d4}, {d4}, and {d2, d3} is empty, a race condition is detected. According to one embodiment of the invention, the system may solve the race condition by requiring that path 2 use a lock on d4 before accessing d2.

Figure 7:
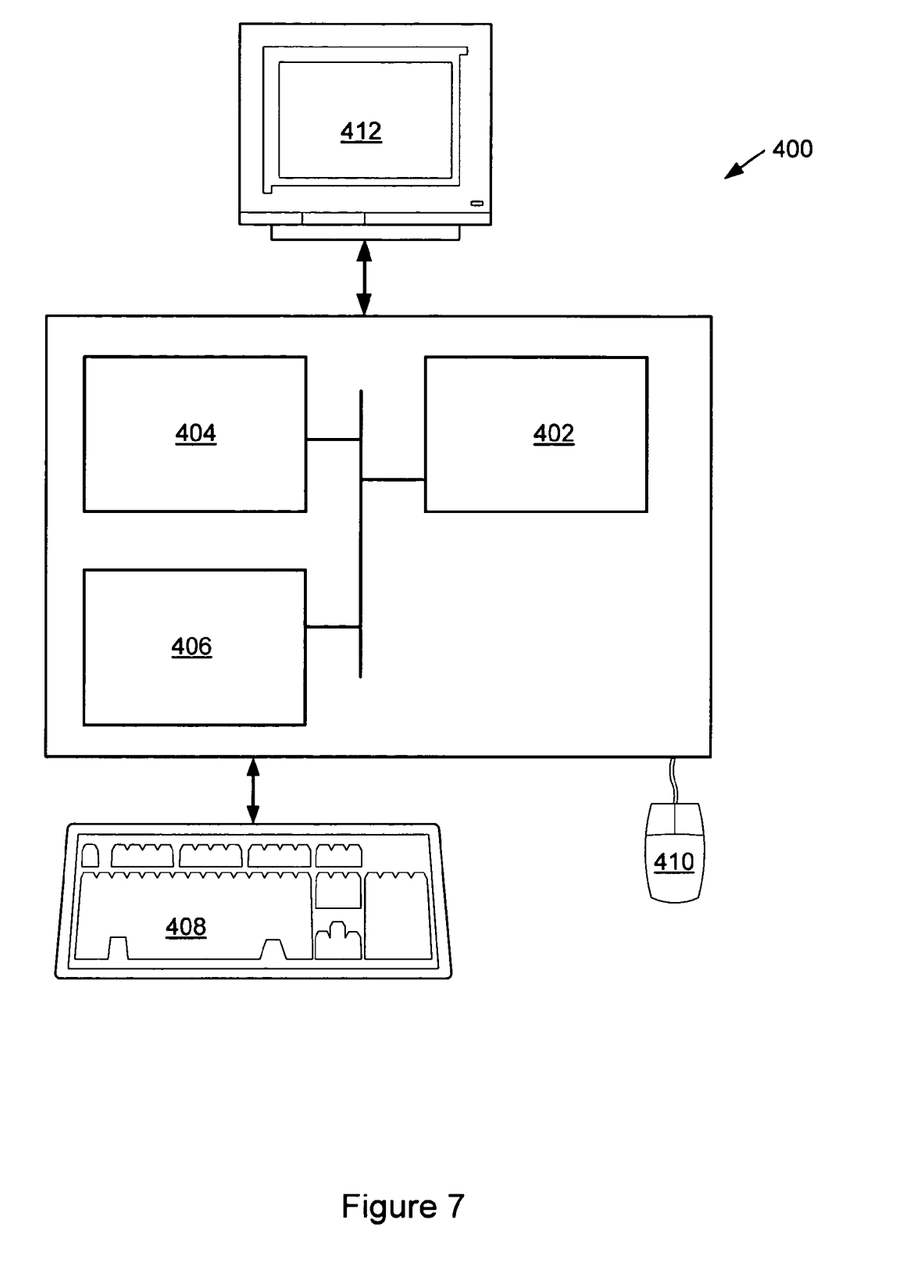
FIG. 7 shows a networked computer system in accordance with an embodiment of the present invention.

The invention may be implemented on virtually any type of multiple processor, multiple threaded or multiple process computer regardless of the platform being used. For example, as shown in FIG. 7, a computer system (400) includes at least one processor (402), associated memory (404), a storage device (406), and numerous other elements and functionalities. The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., data repository, static analyzer, path generator, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

Embodiments of this invention have one or more of the following advantages. First, because an analysis may be performed prior to execution, processes may be prevented from being executed without affecting the state of the system. Further, the race condition detection is easier to implement than past methods. Also, using data dependencies allows for a more complete detection system. Specifically, race conditions that would not be detected without data dependency information is now detectable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a race condition using static analysis comprising:
   generating a first lock set, wherein the first lock set represents access rights that a first path of a plurality of paths has to a plurality of data elements when accessing a first data element of the plurality of data elements;
   generating a second lock set, wherein the second lock set represents access rights that a second path of the plurality of paths has to the plurality of data elements when accessing a second data element of the plurality of data elements;
   generating a first permit set for the first lock set, wherein generating the first permit set comprises:
      creating a first data set, wherein the first data set comprises each data element of the plurality of data elements on which the first data element is dependent wherein the first data set comprises at least two data elements, and wherein the first permit set associates the first data set with access rights that the first path has to the plurality of data elements when accessing the first data element;
   generating a second permit set for the second lock set, wherein generating the second permit set comprises:
      creating a second data set, wherein the second data set comprises each data element of the plurality of data elements on which the second data element is dependent, and wherein the second permit set associates the second data set with access rights that the second path has to the plurality of data elements when accessing the second data element; and
   performing a static analysis, using a processor of a computer system, wherein the static analysis comprises using the first permit set and the second permit set to detect a race condition,
   wherein the static analysis is performed prior to accessing critical data and comprises:
      determining that the intersection of the first data set and the second data set is not empty;
      determining whether the intersection of the first permit set and the second permit set is empty based on the intersection of the first data set and the second data set being not empty; and
      if the intersection of the first permit set and the second permit set is empty, then outputting a value indicating the detection of the race condition.

2. The method of claim 1, further comprising:
   creating a tree from a plurality of dependency relationships between the plurality of data elements, wherein the tree comprises a plurality of data sets, wherein the first data set and the second data set are two of the plurality of data sets.

3. The method of claim 1, wherein the first data set is a minimum data set comprising the first data element and the second data set is a minimum data set comprising the second data element.

4. The method of claim 1, wherein the first path and the second path are different paths.

5. The method of claim 1, wherein the first path has access rights to a data element of the plurality of data elements when the first path has locked the data element and then not unlocked the data element.

6. A computer system for detecting a race condition using static analysis comprising:

a processor;

a memory; and software instructions stored in memory for causing the processor to:

generate a first lock set, wherein the first lock set represents access rights that a first path of a plurality of paths has to a plurality of data elements when accessing a first data element of the plurality of data elements;

generate a second lock set, wherein the second lock set represents access rights that a second path of the plurality of paths has to the plurality of data elements when accessing a second data element of the plurality of data elements;

generate a first permit set for the first lock set, wherein generating the first permit set comprises:

creating a first data set, wherein the first data set comprises each data element of the plurality of data elements on which the first data element is dependent, wherein the first data set comprises at least two data elements, and wherein the first permit set associates the first data set with access rights that the first path has to the plurality of data elements when accessing the first data element;

generate a second permit set for the second lock set, wherein generating the second permit set comprises:

creating a second data set, wherein the second data set comprises each data element of the plurality of data elements on which the second data element is dependent, and wherein the second permit set associates the second data set with access rights that the second path has to the plurality of data elements when accessing the second data element; and perform a static analysis, wherein the static analysis comprises using the first permit set and the second permit set to detect a race condition, wherein the static analysis is performed prior to accessing critical data and comprises:

determining that the intersection of the first data set and the second data set is not empty;

determining whether the intersection of the first permit set and the second permit set is empty based on the intersection of the first data set and the second data set being not empty; and if the intersection of the first permit set and the second permit set is empty, then outputting a value indicating the detection of the race condition.

7. The computer system of claim 6, wherein the software instructions further cause the processor to:

create a tree from a plurality of dependency relationships between the plurality of data elements, wherein the tree comprises a plurality of data sets, wherein the first data set and the second data set are two of the plurality of data sets.

8. The computer system of claim 6, wherein the first data set is a minimum data set comprising the first data element and the second data set is a minimum data set comprising the second data element.

9. The computer system of claim 6, wherein the first path and the second path are different paths.

10. The computer system of claim 6, wherein the first path has access rights to a data element of the plurality of data elements when the first path has locked the data element and then not unlocked the data element.

11. A computer readable medium comprising computer readable program code stored therein, the computer readable program code for causing a processor to perform a method, the method comprising:

generating a first lock set, wherein the first lock set represents access rights that a first path of a plurality of paths has to a plurality of data elements when accessing a first data element of the plurality of data elements;

generating a second lock set, wherein the second lock set represents access rights that a second path of the plurality of paths has to the plurality of data elements when accessing a second data element of the plurality of data elements;

generating a first permit set for the first lock set, wherein generating the first permit set comprises:

creating a first data set, wherein the first data set comprises each data element of the plurality of data elements on which the first data element is dependent, wherein the first data set comprises at least two data elements, and wherein the first permit set associates the first data set with access rights that the first path has to the plurality of data elements when accessing the first data element;

generating a second permit set for the second lock set, wherein generating the second permit set comprises:

creating a second data set, wherein the second data set comprises each data element of the plurality of data elements on which the second data element is dependent, and wherein the second permit set associates the second data set with access rights that the second path has to the plurality of data elements when accessing the second data element; and performing a static analysis, wherein the static analysis comprises using the first permit set and the second permit set to detect a race condition, wherein the static analysis is performed prior to accessing critical data and comprises:

determining that the intersection of the first data set and the second data set is not empty;

determining whether the intersection of the first permit set and the second permit set is empty based on the intersection of the first data set and the second data set being not empty; and if the intersection of the first permit set and the second permit set is empty, then outputting a value indicating the detection of the race condition.

12. The computer readable medium of claim 11, wherein the method further comprises:

creating a tree from a plurality of dependency relationships between the plurality of data elements, wherein the tree comprises a plurality of data sets, wherein the first data set and the second data set are two of the plurality of data sets.

13. The computer readable medium of claim 11, wherein the first data set is a minimum data set comprising the first data element and the second data set is a minimum data set comprising the second data element.

14. The computer readable medium of claim 11, wherein the first path and the second path are different paths.

15. The computer readable medium of claim 11, wherein the first path and the second path are the same path.

16. The computer readable medium of claim 11, wherein the first path has access rights to a data element of the plurality of data elements when the first path has locked the data element and then not unlocked the data element.

* * * * *